US010817629B2

(12) United States Patent
Gumussoy et al.

(10) Patent No.: US 10,817,629 B2
(45) Date of Patent: Oct. 27, 2020

(54) DISCRETIZATION OF A MODEL OF A SYSTEM OR A PORTION OF THE MODEL USING SYSTEM INPUTS AND OUTPUTS

(71) Applicant: The MathWorks, Inc., Natick, MA (US)

(72) Inventors: Suat Gumussoy, Boston, MA (US); Pieter J. Mosterman, Framingham, MA (US); Ahmet Ozdemir, Brookline, MA (US)

(73) Assignee: The MathWorks, Inc., Natick, MA (US)

( * ) Notice: Subject to any disclaimer, the term of this patent is extended or adjusted under 35 U.S.C. 154(b) by 657 days.

(21) Appl. No.: 15/656,560

(22) Filed: Jul. 21, 2017

(65) Prior Publication Data

US 2019/0026404 A1    Jan. 24, 2019

(51) Int. Cl.
*G06F 30/20*    (2020.01)
*G06F 111/10*    (2020.01)

(52) U.S. Cl.
CPC .......... *G06F 30/20* (2020.01); *G06F 2111/10* (2020.01)

(58) Field of Classification Search
CPC ... G05B 19/042; G06F 30/327; G06F 11/362; G06F 30/367; G06K 9/00516; G11B 5/5547

See application file for complete search history.

(56) References Cited

U.S. PATENT DOCUMENTS

| | | | |
|---|---|---|---|
| 7,487,078 B1 * | 2/2009 | Phillips | G06F 30/367 703/19 |
| 2004/0071363 A1 * | 4/2004 | Kouri | G06K 9/00516 382/276 |
| 2006/0023340 A1 * | 2/2006 | Kim | G11B 5/5547 360/77.02 |
| 2010/0299651 A1 * | 11/2010 | Fainekos | G06F 11/362 717/104 |
| 2012/0226726 A1 * | 9/2012 | Pimentel | G06F 30/327 708/270 |
| 2016/0357166 A1 * | 12/2016 | Rehor | G05B 19/042 |

OTHER PUBLICATIONS

Chida et al., "Discretization Method of Continuous-time Controllers Based on Frequency Response Fitting", Proceedings of the European Control Conference 2007, Jul. 2-5, 2007, 8 pages.

(Continued)

*Primary Examiner* — Kandasamy Thangavelu
(74) *Attorney, Agent, or Firm* — Young Basile Hanlon & MacFarlane, P.C.

(57) ABSTRACT

According to some possible implementations, a method may include determining one or more inputs to a model of a system and one or more outputs from the model. The method may include identifying a continuous portion of the model to be discretized. The method may include discretizing the continuous portion of the model, using at least one of a continuous linear representation for the model or a frequency response associated with the continuous linear representation, to generate a discrete linear representation for the continuous portion of the model. The method may include outputting information associated with the discrete linear representation to permit the continuous portion of the model to be implemented on one or more processors.

20 Claims, 11 Drawing Sheets

(56) References Cited

OTHER PUBLICATIONS

Ozdemir et al., "Transfer Function Estimation in System Identification Toolbox via Vector Fitting", MathWorks, 6 pages.
Wang et al., "High-performance conversions between continuous- and discrete-time systems", Elsevier Science, 2001, 13 pages.
Nagahara et al., "Optimal Discretization of Analog Filters via Sampled-Data H∞ Control Theory", IEEE International Conference on Control Applications (CCA), Aug. 28-30, 2013, 6 pages.
Wikipedia, "Discretization", https://en.wikipedia.org/wiki/Discretization, Mar. 24, 2017, 5 pages.
Wikipedia, "Control theory", https://en.wikipedia.org/wiki/Control_theory, Jul. 21, 2017, 16 pages.
MathWorks, "Sample Times in Systems", https://www.mathworks.com/help/simulink/ug/managing-sample-times-in-systems.html, 2017, 4 pages.

* cited by examiner

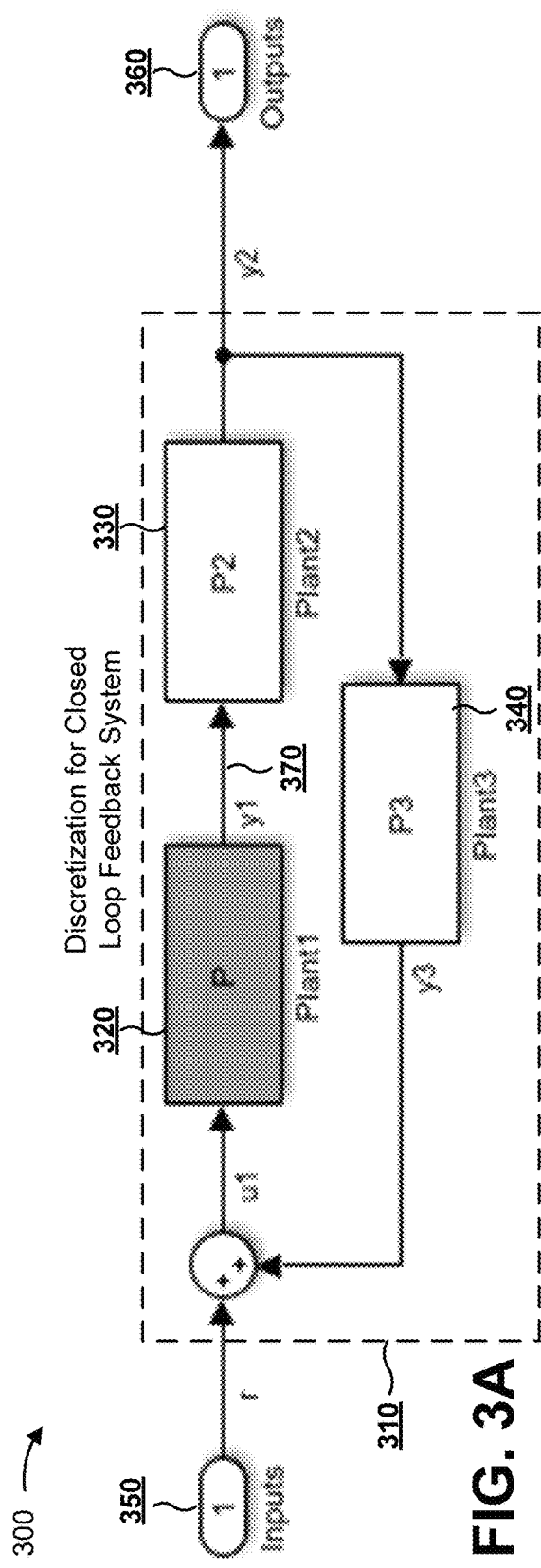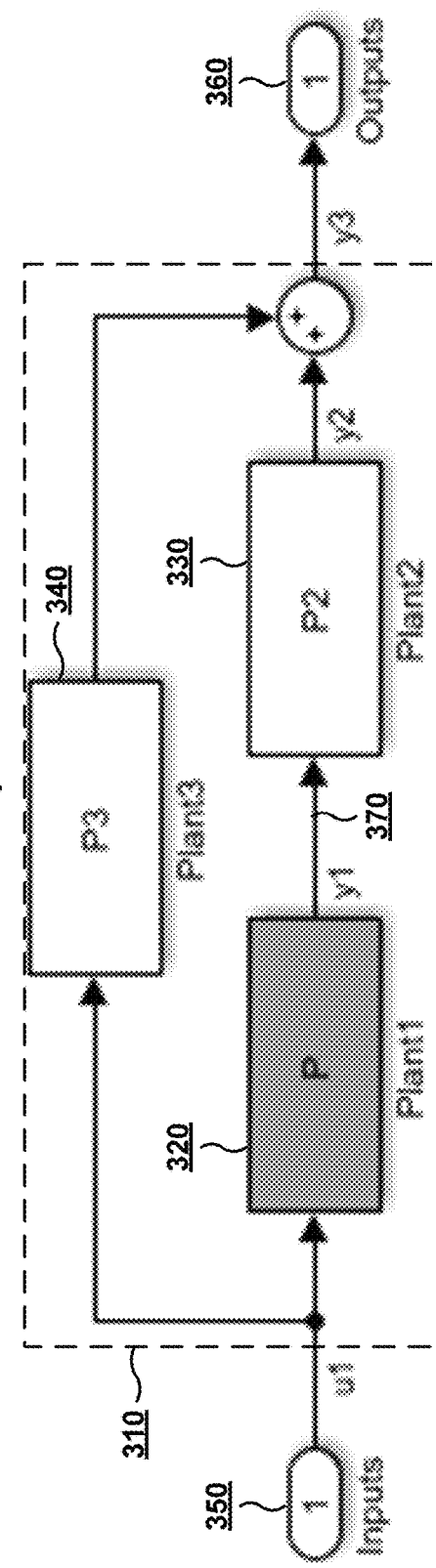
FIG. 3A
FIG. 3B

DISCRETIZATION OF A MODEL OF A SYSTEM OR A PORTION OF THE MODEL USING SYSTEM INPUTS AND OUTPUTS

BRIEF DESCRIPTION OF THE DRAWINGS

FIGS. 1-8 are diagrams of examples of discretizing a model of a system or a portion of the model using system inputs and outputs;

DETAILED DESCRIPTION

The following detailed description of example implementations refers to the accompanying drawings. The same reference numbers in different drawings may identify the same or similar elements.

A model may be used to represent a system, such as a physical system, a computing system, an engineered system, an embedded system, a biological system, a chemical system, and/or the like. The system may operate continuously, and the model, when executed, may simulate the continuous behavior of the system. However, in order to execute the model on one or more processors, the model may need to be discretized because processors operate using discrete step-by-step instructions. Discretization refers to the process of transferring continuous models (e.g., which may include functions, equations, program code, block diagrams, and/or the like) to discrete models, which may be performed so that the continuous model can be implemented on a processor. Whenever discretization occurs, there is discretization error when the discretized model does not exactly represent the continuous model. By reducing discretization error, the model may more closely simulate the behavior of the system being modeled when the model is executed on a processor.

Some discretization techniques, such as zero-order hold, first-order hold, bilinear (e.g., Tustin) approximation, zero-pole matching (e.g., for a single-input-single-output system), and/or the like, may use inputs to and outputs from a model (or a portion of a model) to discretize the model (or the portion of the model) without taking into account connected models (or portions), feedback loops, rate conversions, and/or the like. These techniques may approximate a response of the system using only the system itself, without considering connected systems, feedback loops, rate conversions that may happen between systems and/or portions of the system, and/or the like. This may lead to a less accurate approximation of the system response, with more discretization error than if these connected systems, feedback loops, rate conversions, etc. are taken into account. Some implementations described herein may reduce discretization error by taking these factors into account during discretization, thereby resulting in a discretized model that more accurately simulates behavior of the system being modeled.

Figure 1:
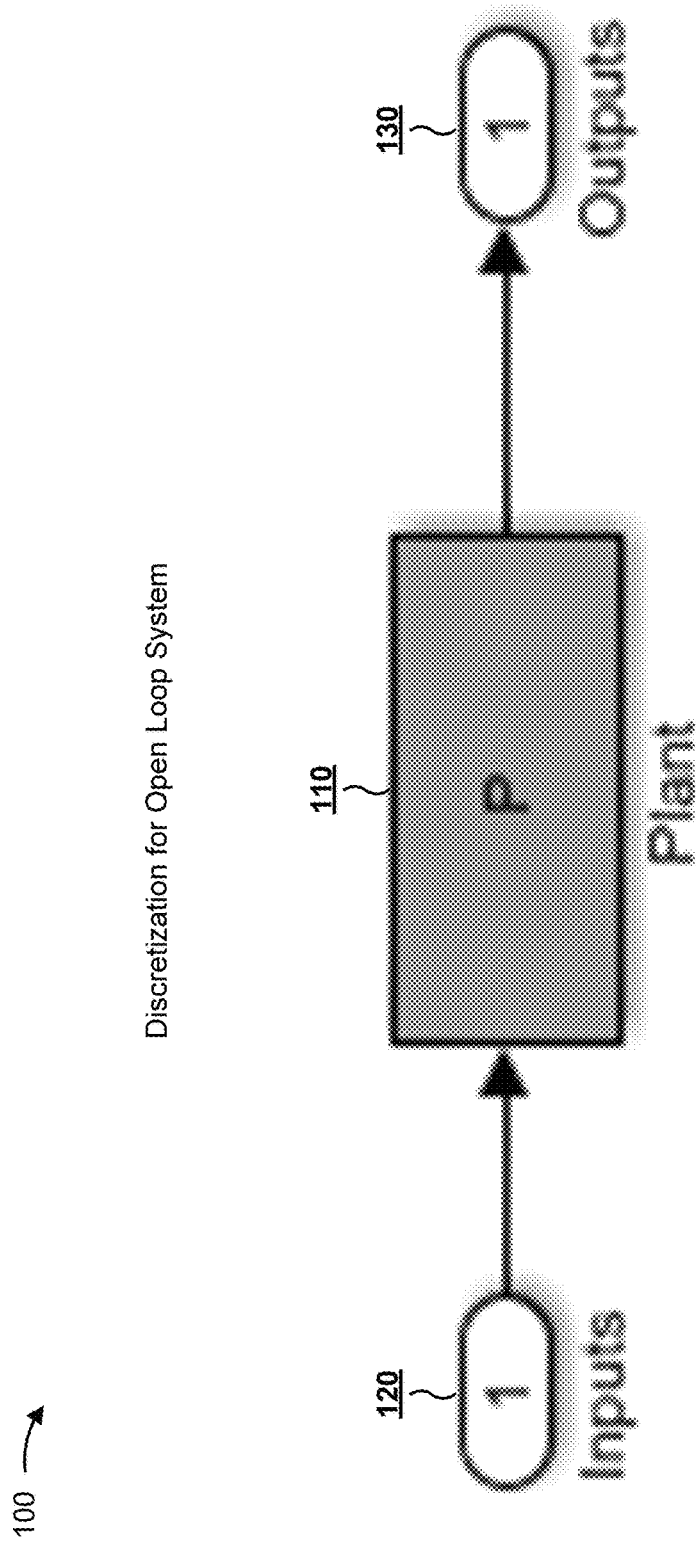

FIG. 1 is a diagram of an example 100 of discretizing a portion of a model of a system using system inputs and outputs. FIG. 1 depicts an open loop model that includes a portion 110 to be discretized, an input 120 to the portion of the model, and an output 130 from the portion of the model. In this case, the portion 110 represents one continuous-time system (shown as a plant P, but which could be a controller C) to be discretized, and the model does not include any feedback or feedforward signal connections. This type of model may be referred to as an open loop model because the model does not have any feedback signal paths from the output 130 to the input 120. The model is shown as a block diagram model for explanation, but could be represented in another manner (e.g., using program code, a state machine, symbolic equations, and/or the like).

In some implementations, a technical computing environment (TCE), which may operate on a computing device (as described in more detail elsewhere herein) may discretize the portion 110 of the model. For example, the TCE may discretize the portion 110 of the model to generate a discrete linear representation of the model with frequency responses that have a reduced distance to corresponding frequency responses of a continuous linear representation of the portion 110 of the model. In some implementations, the portion 110 may be a continuous-time linear system, and the TCE may extract a frequency response of the portion 110. The TCE may discretize the portion 110 by implementing one or more numerical optimization methods to determine parameters of a discrete-time linear system that have a similar frequency response to the continuous-time linear system.

In some implementations, the model may be a linear model. In some implementations, the model may be a non-linear model, in which case the TCE may operate on the non-linear model to obtain a linear model. In some implementations, the model may be designed in the TCE, which may include an editor with which a user can interact to design and/or load the model.

In some implementations, a user may interact with the TCE to input the model, the portion 110 of the model, the inputs 120, and/or the outputs 130. For example, the user may provide user input to identify the inputs 120 and/or the outputs 130. As another example, the TCE may use a model pattern, one or more input ports of the model, one or more output ports of the model, and/or the like, to determine the inputs 120 and/or the outputs 130. Additionally, or alternatively, the user may input, or the TCE may extract (e.g., from the model), frequency response data (e.g., a set of frequency responses) associated with the model. Additionally, or alternatively, the TCE may obtain frequency response data by injecting signals at the inputs 120 of the model and measuring the outputs 130 from the model. In some implementations, the TCE may obtain a continuous linear representation of the portion 110 of the model, such as by generating the continuous linear representation and/or extracting a set of frequency responses from the continuous linear representation. A linear representation may include, for example, a transfer function, a state-space matrix, a zero-pole gain, and/or the like. In some implementations, the TCE may obtain a continuous linear representation for only continuous portion(s) of the model.

In some implementations, a model pattern may include, for example, a model pattern that indicates a feedforward portion, a model pattern that indicates a feedback portion, a model pattern that indicates an open loop, a model pattern that indicates a closed loop, a model pattern that indicates adaptive control, a model pattern that indicates model reference adaptive control, a model pattern that indicates dynamic inversion, a model pattern that indicates linear fractional transformation, a model pattern that indicates switched control, and/or the like.

In some implementations, the user may input a sample time for the discrete linear representation to be generated by the TCE, and the TCE may generate the discrete linear representation based on the sample time. Additionally, or alternatively, the user may input a threshold degree of similarity for the discrete frequency response and the continuous frequency response, and the TCE may generate the discrete linear representation based on the threshold degree of similarity. This may conserve computing resources when less similarity is requested, and may result in less discretization error when more similarity is requested. Additionally, or alternatively, the user may input, or the TCE may determine, a time delay associated with the input 120, a time delay associated with the output 130, a time delay associated with generating the discrete linear representation, and/or the like. The TCE may account for such time delays when generating the discrete linear representation, such as by offsetting the discrete frequency response to account for such time delays and more closely match the continuous frequency response.

Additionally, or alternatively, the user may input, or the TCE may determine, a subset of inputs and/or outputs to be discretized. In some cases, every input and output may not need to be discretized depending on how the user intends to use the discrete linear representation. In this case, the TCE may generate the discrete linear representation based on the subset of inputs and/or outputs to be discretized. This may conserve computing resources by preventing discretization of all inputs and outputs.

In some implementations, the TCE may determine one or more inputs 120 to a model of a system, may determine one or more outputs 130 from the model, and may identify a portion 110 of the model to be discretized. In some cases, the portion may represent the entire model, as shown in FIG. 1. The TCE may obtain a continuous linear representation for the model based on the one or more inputs and the one or more outputs. The TCE may discretize the portion of the model to generate a discrete linear representation for the portion of the model. In some implementations, the TCE may discretize the portion of the model using the continuous linear representation. Additionally, or alternatively, the TCE may discretize the portion of the model using a frequency response associated with the continuous linear representation. The TCE may output information associated with the discrete linear representation to permit the portion of the model to be implemented on one or more processors. Such information may include, for example, the discrete linear representation, inputs and/or outputs associated with the discrete linear representation, a discrete frequency response, and/or the like. In some implementations, the TCE may obtain a continuous linear representation for only continuous portion(s) of the model (e.g., because discrete portion(s) of the model are already represented by discrete linear representations).

In some implementations, the TCE may generate the discrete linear representation by mapping frequency points, associated with the continuous linear representation, to a unit circle. For example, the TCE may generate the discrete linear representation by mapping the frequency points to the unit circle based on a distance measure between adjacent frequency points. For example, the TCE may map the frequency points to the unit circle to maximize a minimum distance between adjacent frequency points (e.g., the distance measure may be selected to maximize the minimum distance). In some cases, such maximization may be reconfigured as a minimization problem. Additionally, or alternatively, the TCE may normalize frequency responses associated with the continuous linear representation. In this way, the TCE may reduce discretization error.

As indicated above, FIG. 1 is provided as an example. Other examples are possible and may differ from what was described in connection with FIG. 1.

Figure 2:
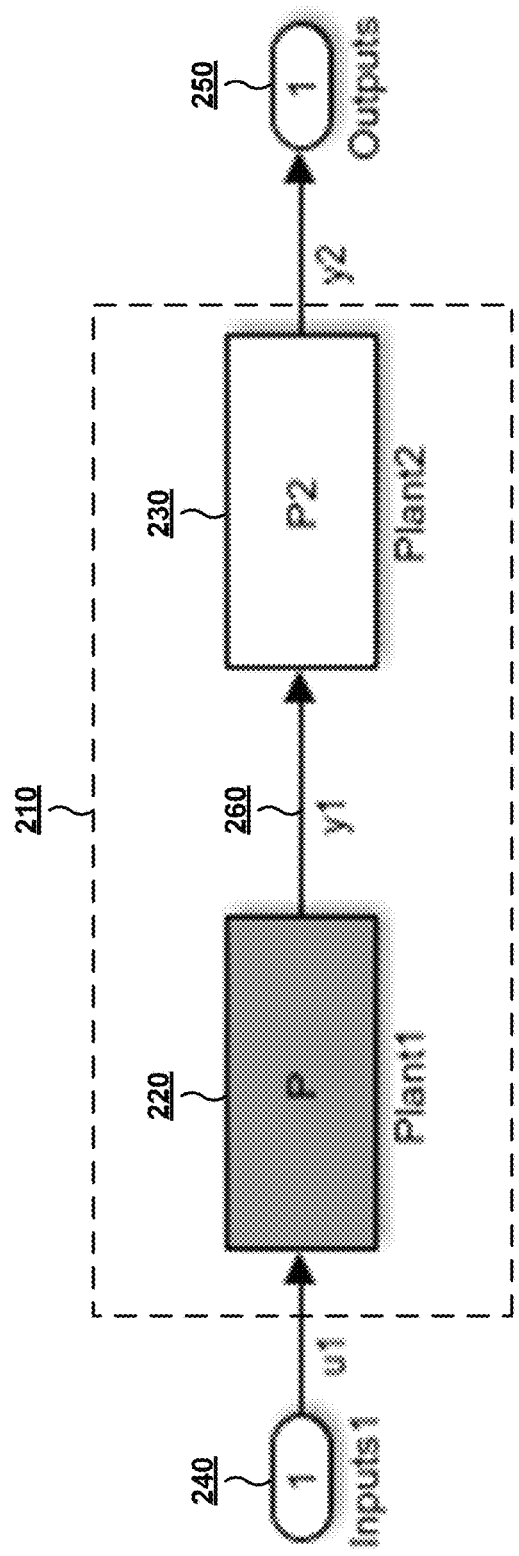

FIG. 2 is a diagram of an example 200 of discretizing a portion of a model of a system using system inputs and outputs. FIG. 2 depicts an open loop model 210 that includes a first portion 220 to be discretized, a second portion 230 that is not to be discretized, a set of inputs 240 to the model, and a set of outputs 250 from the model. In this case, the model 210 represents two systems that are connected in series, with a first portion 220 to be discretized (shown as a plant P, but which could be a controller C) and a second portion 230 that is not to be discretized (shown as a plant P2, but which could be a controller C2). Although FIG. 2 shows the first portion 220 as the portion to be discretized and the second portion 230 as the portion not to be discretized, in some implementations, the first portion 220 may be the portion not to be discretized and the second portion 230 may be the portion to be discretized. As described above in connection with FIG. 1, the model 210 is an open loop model because the model 210 does not include any feedback or feedforward signal connections.

In some implementations, the first portion 220 to be discretized is a continuous portion of the model 210. In the case where the model 210 includes continuous portions and discrete portions, the continuous portions may be discretized according to techniques described herein. Additionally, or alternatively, the discrete portions may be maintained as discrete (e.g., for implementation on one or more processors). In some implementations, the TCE may use discrete linear representations for discrete portions of the model 210 to generate frequency responses for the discrete portions of the model 210. Additionally, or alternatively, the TCE may obtain and/or generate continuous linear representations for continuous portions of the model 210, and may use the continuous linear representations to generate frequency responses for the continuous portions of the model 210. In some cases, if the TCE cannot obtain and/or generate a continuous representation (e.g., if a block contains proprietary code), then the TCE may inject signals into the input(s) 240 and measure signals from the output(s) 250 to obtain the frequency responses.

In some implementations, a TCE may discretize the first portion 220 of the model 210. For example, the TCE may discretize the first portion 220 of the model 210 to generate a discrete linear representation of the first portion 220 of the model 210 with frequency responses that have a reduced distance to corresponding frequency responses of a continuous linear representation for the model 210. In this case, the frequency responses may represent a relationship between a set of inputs 240 to the model 210 and a set of outputs 250 from the model 210 (e.g., a relationship between u1 and y2), rather than a relationship between inputs to the first portion 220 and outputs from the first portion 220 (e.g., a relationship between u1 and y1). In this way, the TCE can reduce discretization error as it relates to inputs to and outputs from the entire model, rather than a portion of the model, thereby improving accuracy of simulation of the entire model.

In some implementations, a user may interact with the TCE to input the model 210, the first portion 220 of the model 210, the second portion 230 of the model 210, the set of inputs 240, the set of outputs 250, and/or intra-model data 260 transferred between the first portion 220 and the second portion 230. For example, the user may provide user input to identify the set of inputs 240, the set of outputs 250, and/or the intra-model data 260. As another example, the TCE may use a model pattern, one or more input ports associated with the model 210, one or more outputs ports associated with the model 210, and/or the like, to determine the set of inputs 240, the set of outputs 250, and/or the intra-model data 260.

In some implementations, the user may provide input that identifies the first portion 220 of the model 210 to be discretized and/or the second portion 230 of the model 210 that is not to be discretized. In this case, the TCE may extract frequency response data associated with the first portion 220 and/or the second portion 230. Additionally, or alternatively, the user may input frequency response data associated with the first portion 220 and/or the second portion 230. The second portion 230 may be represented by a continuous linear representation and/or a discrete representation. For example, the second portion 230 may be represented entirely by a continuous linear representation, entirely by a discrete representation, or by a mixed representation that includes continuous parts and discrete parts.

If the second portion 230 is a continuous-time linear system, then the TCE may determine a signal reconstructor (e.g., zero-order hold, first-order hold, and/or the like) to be used at an input of the second portion 230. For example, the user may specify a signal reconstructor to be used, the TCE may select a default signal reconstructor, the model 210 may include a signal reconstructor (e.g., between the first portion 220 and the second portion 230), and/or the like. The TCE may use this signal reconstructor to discretize the second portion 230. The TCE may extract a combined frequency response from the first portion 220 and the second portion 230, and may discretize the first portion 220 by implementing one or more numerical optimization methods to determine parameters of a discrete-time linear system representing the first portion 220, such that a combination of the discrete-time linear system and the discretized second portion 230 is the same or similar as the combined frequency response from the first portion 220 and the second portion 230.

If the second portion 230 is a discrete-time linear system, then the TCE may extract a combined frequency response from the first portion 220 and the discrete-time second portion 230, and may discretize the first portion 220 by implementing one or more numerical optimization methods to determine parameters of a discrete-time linear system representing the first portion 220, such that a combination of the discrete-time linear system and the second portion 230 is the same or similar as the combined frequency response from the first portion 220 and the discretized second portion 230.

In some implementations, the user may input, or the TCE may determine, a sample time for the discrete linear representation, a threshold degree of similarity for the discrete frequency response and the continuous frequency response, a time delay associated with the model 210, a subset of inputs and/or outputs to be discretized, and/or the like, as described above in connection with FIG. 1. The TCE may use this information to generate the discrete linear representation, as described above in connection with FIG. 1. In some implementations, the TCE may determine the sample time based on performance constraints. For example, a user may specify real time constraints, such as a time budget available to compute an output at a given sample time. Based on this time budget, the TCE may determine a sample time that meets the constraint, and the corresponding discrete linear representation. Note that the term sample rate is used to describe some implementations herein (e.g., in association with model partitioning and/or the like. In some implementations, a sample time may be used in addition to or as an alternative to a sample time. A sample rate may be the inverse of the period of the sample time.

In some implementations, the TCE may determine one or more inputs 240 to the model 210, may determine one or more outputs 250 from the model 210, and may identify a first portion 220 to be discretized. Additionally, or alternatively, the TCE may identify a second portion 230 not to be discretized. In some cases, the first portion 220 to be discretized may represent less than the entire model 210, as shown in FIG. 2. The TCE may obtain a continuous linear representation for the model 210 based on the one or more inputs 240 and the one or more outputs 250. The TCE may discretize the first portion 220 of the model 210 to generate a discrete linear representation for the first portion 220 of the model 210. In some implementations, the TCE may discretize the first portion 220 of the model 210 using the continuous linear representation. Additionally, or alternatively, the TCE may discretize the first portion 220 of the model 210 using a frequency response associated with the continuous linear representation. The TCE may output information associated with the discrete linear representation to permit the first portion 220 of the model 210 to be implemented on one or more processors, as described above in connection with FIG. 1.

In some implementations, the TCE may generate the discrete linear representation by mapping frequency points, associated with the continuous linear representation, to a unit circle. For example, the TCE may map the frequency points to the unit circle to maximize a minimum distance between adjacent frequency points. Additionally, or alternatively, the TCE may normalize frequency responses associated with the continuous linear representation. In this way, the TCE may reduce discretization error.

In some implementations, techniques described herein may be used in numerical simulation. For example, if the first portion 220 is a continuous time system, a differential equation solver (e.g., an Euler solver and/or the like) could be used to simulate the behavior of the first portion 220 to generate approximations of continuous time behavior using numerical integration methods. However, this may lead to inaccuracies because the numerical integration methods are approximations. In some cases, the techniques described herein may be applied to the first portion 220 to discretize the first portion 220 so that the first portion 220 is not represented by a differential equation (e.g., which is used to represent continuous time systems). Because the first portion 220 is not represented by a differential equation, a differential equation solver is not needed for numerical simulation. By performing numerical simulation on the discrete representation of the first portion 220, the accuracy of approximations of continuous time behavior of the first portion 220 may be improved as compared to using a differential equation solver.

In some implementations, discrete representation may be derived during numerical simulation as an operating point, associated with the model, changes. For example, the TCE may determine a first operating point at the start of simulation, may derive a first linear continuous representation at this operating point, and may derive a first discrete representation from the first linear continuous representation. Simulation may then proceed to change the operating point. At a given second operating point, the TCE may determine that a new discrete representation may be derived. This determination may be made based on comparing the linear continuous representations. For example, a second linear continuous representation may be derived for the second operating point and the difference between the first linear continuous representation and the second linear representation may exceed a threshold. Difference metrics may be based on elements in matrices or matrix properties (e.g., eigenvalues, trace, determinant, norm, and/or the like). The TCE may derive a second discrete representation for the second continuous representation. Simulation may then proceed with the second discrete operation and further change the operating point, where the process may be repeated. Other criteria for deriving a new discrete representation may be used (e.g., at the first operating point, two different discrete representations may be derived based on different sample times and when during simulation the state variable values of different discrete representations differ by more than a threshold, the second linear continuous representation may be derived and two new discrete representations based on the two different sample times).

As indicated above, FIG. 2 is provided as an example. Other examples are possible and may differ from what was described in connection with FIG. 2.

FIGS. 3A and 3B are diagrams of examples 300 of discretizing a portion of a model of a system using system inputs and outputs. FIGS. 3A and 3B depict example closed loop models 310 that include a first portion 320 to be discretized, a second portion 330 that is not to be discretized, a feed portion 340 (e.g., a feedback or feedforward portion, which is also not to be discretized in the examples of FIGS. 3A and 3B), a set of inputs 350 to the model, and a set of outputs 360 from the model. Although FIGS. 3A and 3B show all portions as plants, in some implementations, one or more portions may be controllers. Furthermore, although FIGS. 3A and 3B show the first portion 320 as the portion to be discretized and the second portion 330 and the feed portion 340 as the portions not to be discretized, in some implementations, one or more portions other than the first portion 320 may be discretized (e.g., including or excluding the first portion 320). For example, a user may provide input to select one or more portions to be discretized.

In some implementations, a TCE may discretize the first portion 320 of the model 310. For example, the TCE may discretize the first portion 320 of the model 310 to generate a discrete linear representation of the first portion 320 of the model 310 with frequency responses of the model 310 (e.g., frequency responses of the first portion 320 being discretized) that have a reduced distance to corresponding frequency responses of a continuous linear representation for the model 310 (e.g., corresponding frequency responses of the entire model 310). In this case, the frequency responses may represent a relationship between a set of inputs 350 to the model 310 and a set of outputs 360 from the model 310 (e.g., a relationship between r and y2 of FIG. 3A or a relationship between u1 and y3 of FIG. 3B), rather than a relationship between inputs to the first portion 320 and outputs from the first portion 320 (e.g., a relationship between u1 and y1 of FIG. 3A or FIG. 3B). In this way, the TCE can reduce discretization error as it relates to inputs to and outputs from the entire model, rather than a portion of the model, thereby improving accuracy of simulation of the entire model.

For the closed loop feedback system of FIG. 3B, the TCE may perform the discretization in the manner described above in connection with FIG. 2 since the impact of the feed portion 340 on the u1 to y3 relationship of FIG. 3B is independent of the first portion 320 to be discretized.

In some implementations, a user may interact with the TCE to input the model 310, the first portion 320, the second portion 330, the feed portion 340, the set of inputs 350, the set of outputs 360, and/or intra-model data 370 transferred between the first portion 320 and the second portion 330. For example, the user may provide user input to identify the set of inputs 350, the set of outputs 360, and/or the intra-model data 370. As another example, the TCE may use a model pattern, one or more input ports associated with the model 310, one or more outputs ports associated with the model 310, and/or the like, to determine the set of inputs 350, the set of outputs 360, and/or the intra-model data 370.

In some implementations, the user may provide input that identifies one or more portions to be discretized and/or one or more portions that are not to be discretized. In this case, the TCE may extract frequency response data associated with the portion(s) to be discretized and/or the portion(s) not to be discretized. Additionally, or alternatively, the user may input frequency response data associated with the portion(s) to be discretized and/or the portion(s) not to be discretized. As described above in connection with FIG. 2, the portion(s) not to be discretized may be represented by a continuous linear representation or a discrete representation.

If the second portion 330 and the feed portion 340 (e.g., a feedforward portion, a feedback portion, etc.) are continuous-time linear systems, then the TCE may determine a signal reconstructor to be used at an input of the second portion 330 (e.g., the intra-model data 370). For example, the user may specify a signal reconstructor to be used, the TCE may select a default signal reconstructor, the model 310 may include a signal reconstructor (e.g., between the first portion 320 and the second portion 330), and/or the like. The TCE may extract a combined frequency response from r to y2 of FIG. 3A or u1 to y3 of FIG. 3B (e.g., a combination of the first portion 320, the second portion 330, and the feed portion 340). The TCE may use the signal reconstructor to perform two discretizations: a discretization of the second portion 330 and a discretization of the combination of the second portion 330 and the feed portion 340. The TCE may discretize the first portion 320 by implementing one or more numerical optimization methods to determine parameters of a discrete-time linear system representing the first portion 320, such that a combination of the discrete-time linear system, the discretized second portion 330, and the discretized combination of the second portion 330 and the feed portion 340 is the same or similar as the combined frequency response of the overall model 310 (e.g., from r to y2 in FIG. 3A or from u1 to y3 of FIG. 3B).

If the second portion 330 and/or the feed portion 340 (e.g., a feedforward portion, a feedback portion, etc.) are discrete-time linear systems, then the TCE may utilize the discrete time representation of these portions when discretizing the first portion 320. In some implementations, the signal reconstructor may be placed at a different position in the model 310 based on which portions are discrete time systems and/or which portions are continuous time systems. For example, if the second portion 330 is a discrete time system and the feed portion 340 is a continuous time system, then the signal reconstructor may be placed between the second portion 330 and the feed portion 340. In some implementations, a signal reconstructor may be used at points of the model where the output of a discrete system is the input of a continuous system.

In some implementations, the user may input, or the TCE may determine, a sample time for the discrete linear representation, a threshold degree of similarity for the discrete frequency response and the continuous frequency response, a time delay associated with the model 310, a subset of inputs and/or outputs to be discretized, and/or the like, as described above in connection with FIG. 1. The TCE may use this information to generate the discrete linear representation, as described above in connection with FIG. 1.

In some implementations, the TCE may determine one or more inputs 350 to the model 310, may determine one or more outputs 360 from the model 310, and may identify a first portion 320 to be discretized. Additionally, or alternatively, the TCE may identify one or more portions not to be discretized (e.g., shown as a second portion 330 and a feed portion 340 in FIGS. 3A and 3B). In some cases, the first portion 320 to be discretized may represent less than the entire model 310, as shown in FIGS. 3A and 3B. The TCE may obtain a continuous linear representation for the model 310 based on the one or more inputs 350 and the one or more outputs 360. The TCE may discretize the first portion 320 of the model 310 to generate a discrete linear representation for the first portion 320 of the model 310. In some implementations, the TCE may discretize the first portion 320 of the model 310 using the continuous linear representation. Additionally, or alternatively, the TCE may discretize the first portion 320 of the model 310 using a frequency response associated with the continuous linear representation. The TCE may output information associated with the discrete linear representation to permit the first portion 320 of the model 310 to be implemented on one or more processors, as described above in connection with FIG. 1.

In some implementations, the TCE may generate the discrete linear representation by mapping frequency points, associated with the continuous linear representation, to a unit circle. For example, the TCE may map the frequency points to the unit circle to maximize a minimum distance between adjacent frequency points. Additionally, or alternatively, the TCE may normalize frequency responses associated with the continuous linear representation. In this way, the TCE may reduce discretization error.

As indicated above, FIGS. 3A and 3B are provided as examples. Other examples are possible and may differ from what was described in connection with FIGS. 3A and 3B.

Figure 4:
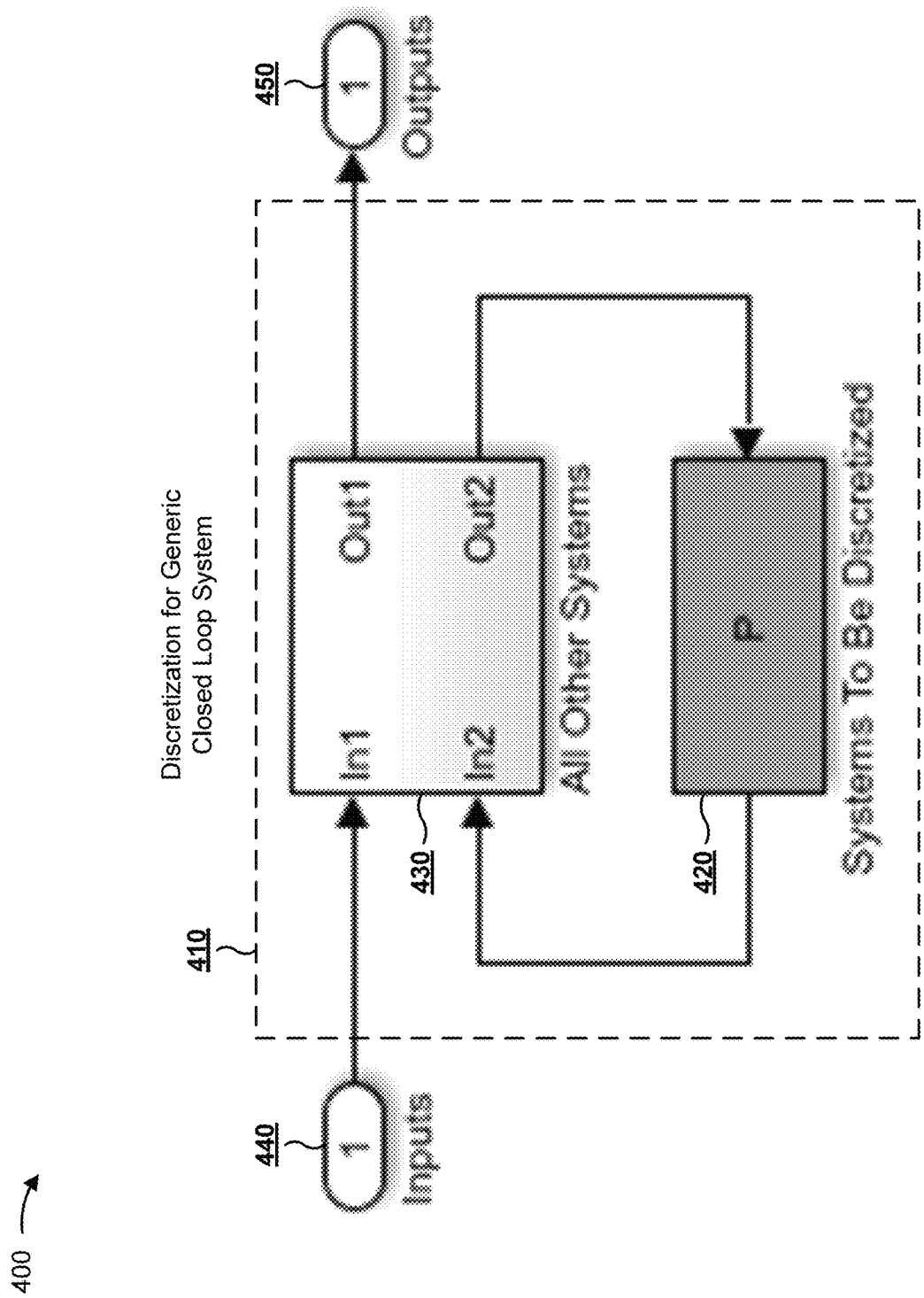

FIG. 4 is a diagram of an example 400 of discretizing a portion of a model of a system using system inputs and outputs. FIG. 4 depicts a generic closed loop system represented as a closed loop model 410 that includes a first portion 420 to be discretized, a second portion 430 that is not to be discretized, a set of inputs 440 to the model 410, and a set of outputs 450 from the model 410. The model 410 shown in FIG. 4 may represent a mathematical reorganization of the models 310 shown in FIG. 3A or 3B. For example, the second portion 330 and the feed portion 340 shown in FIG. 3A or 3B may be represented by the second portion 430 that is not to be discretized, shown in FIG. 4. The TCE may discretize the first portion 420 in a similar manner as described elsewhere herein.

For example, any interconnection can be put in the form of 410 (e.g., a linear fractional transformation), where a first portion 420 to be discretized can be isolated from the remainder of the model 410. The first portion 420 may contain blocks to be discretized, where the inputs to the first portion 420 (shown as Out2) are sampled, continuous-time signals. The TCE may determine the ideal frequency response from input(s) 440 to output(s) 450 before discretization of the first portion 420. The TCE may use numerical optimization methods to determine the parameters of the discrete-time replacement of the first portion 420 so that the frequency response from input(s) 440 to output(s) 450 is similar to the ideal frequency response. If the blocks in the second portion 430 associated with In2 (e.g., the outputs from the first portion 420) are continuous, the TCE may use signal reconstructors in the numerical optimization methods, as described elsewhere herein.

As indicated above, FIG. 4 is provided as an example. Other examples are possible and may differ from what was described in connection with FIG. 4.

Figure 5:
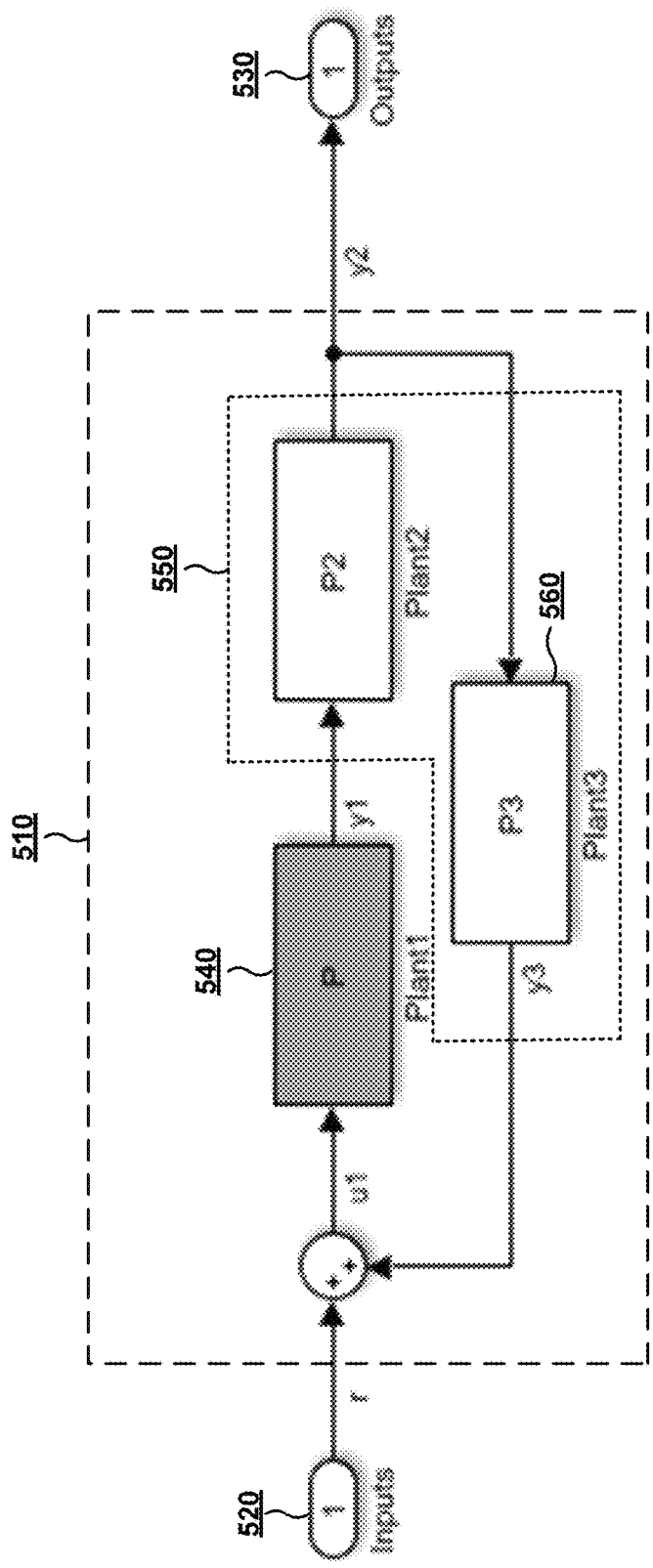

FIG. 5 is a diagram of an example 500 of discretizing a portion of a model of a system using system inputs and outputs. FIG. 5 depicts an example closed loop model 510, and will be used to explain how the TCE may determine the inputs 520 to the model 510 (e.g., shown as r) and the outputs 530 from the model (e.g., shown as y2). The inputs 520 and outputs 530 may be top-level or global model inputs and outputs, rather than the inputs and outputs from the portion of the model 510 to be discretized. As shown, the model 510 may include a first portion 540 to be discretized and a second portion 550 that is not to be discretized. The second portion 550 may include a feedback portion 560, in some implementations.

In some implementations, the TCE may automatically determine the inputs 520 and/or the outputs 530. For example, the user may provide input that indicates the first portion 540 to be discretized. The TCE may determine outgoing signal path(s) originating from the first portion 540 to be discretized (e.g., shown as a signal path y1 from P to P2), such as by identifying one or more output ports of the first portion 540. The TCE may analyze the model 510 to identify portions to which the outgoing signal path(s) connect (e.g., based on signal paths that connect output ports to input ports), and may determine outgoing signal path(s) from those portion(s) until a portion is reached that does not have any outgoing signal paths. The TCE may identify the portion without any outgoing signal paths as the overall output 530 from the model 510. In some implementations, the TCE may reverse the signal paths (e.g., by reversing the direction of the arrows), and may perform the process described above to identify the overall input 520 to the model 510. In this case, the TCE may use the automatically-determined input 520 and output 530 to obtain a continuous linear representation for the model 510, and may use the continuous linear representation and/or a frequency response associated with the continuous linear representation to discretize the first portion 540, as described elsewhere herein.

The TCE may use the above technique to discretize the first portion 540 such that the relationship between the overall inputs 520 to the model 510 (e.g., shown as r) and the overall outputs 530 from the model (e.g., shown as y2) is approximated, with reduced discretization error. In some implementations, the user may want to approximate another relationship (e.g., between u1 and y2 and/or the like). In this case, the user may provide input to identify the relationship to be approximated via the discretization (e.g., by interacting with a signal line on a block diagram model, by selecting a menu item, and/or the like). In this case, the TCE may use the user-identified inputs and outputs to obtain a continuous linear representation for the model 510, and may use the continuous linear representation and/or a frequency response associated with the continuous linear representation to discretize the first portion 540, as described elsewhere herein.

In some implementations, the user may identify the portion(s) to be discretized, the portion(s) that are not to be discretized, and interconnections (e.g., inputs and outputs) between these portions, and the TCE may use this information to discretize the portion to be discretized, as described elsewhere herein.

As indicated above, FIG. 5 is provided as an example. Other examples are possible and may differ from what was described in connection with FIG. 5.

Figure 6:
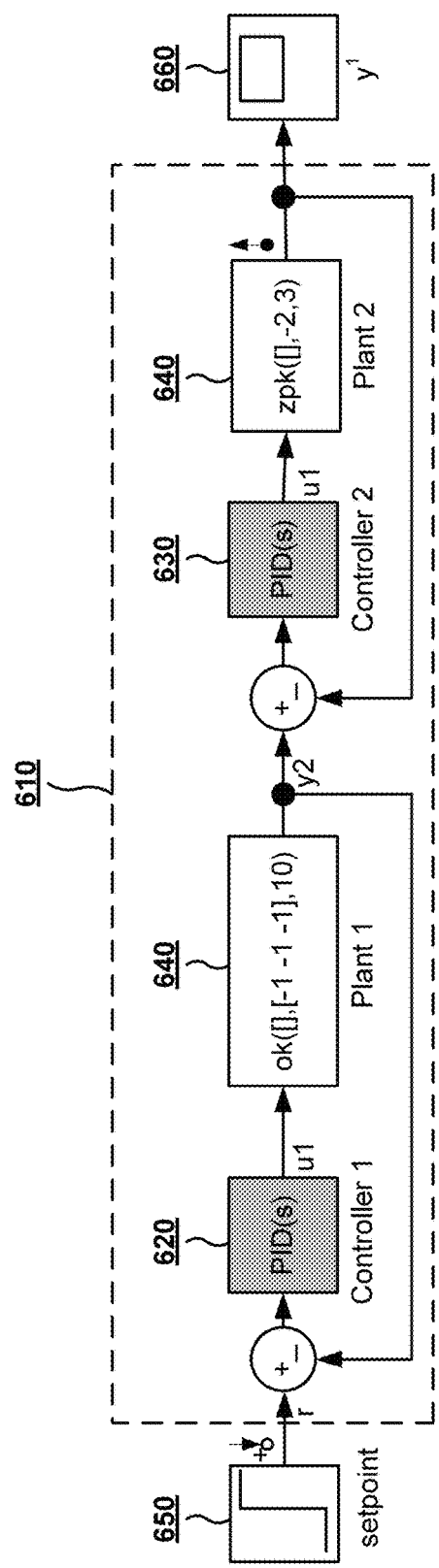

FIG. 6 is a diagram of an example 600 of discretizing a portion of a model of a system using system inputs and outputs. FIG. 6 depicts an example multi-rate model 610. In this example, the user may indicate that a first portion 620 is to be discretized with a sample time of 0.1 seconds (e.g., a first rate) and a second portion 630 is to be discretized with a sample time of 0.5 seconds (e.g., a second rate). Additionally, or alternatively, the user may indicate, or the TCE may determine, one or more portions 640 that are not to be discretized, an input 650 to the model 610, and output 660 from the model 610, and/or the like, as described elsewhere herein.

In some implementations, the user may provide user input that identifies the model 610 (e.g., a block diagram model, program code, and/or the like), a continuous linear representation of one or more portion(s) of the model 610 (e.g., a transfer function for Controller 1, Plant 1, Controller 2, and Plant 2 in the continuous domain), a sample time or rate with which the first portion 620 is to be discretized, a sample time or rate with which the second portion 630 is to be discretized, the input 650, the output 660, and/or the like. The TCE may use the input 650 and the output 660 to obtain a continuous linear representation for the model 610, and may use the continuous linear representation and/or a frequency response associated with the continuous linear representation to discretize the first portion 620 and the second portion 630 to approximate the relationship between the input 650 and the output 660 with reduced discretization error, as described elsewhere herein. In some implementations, the model 610 may be transformed into the form of the model 410 of FIG. 4, described above, and the TCE may discretize the portion(s) to be discretized as described elsewhere herein. The TCE may perform numerical optimization methods to concurrently find the parameters of portions 620 and 630 that achieve a frequency response similar to the ideal frequency response.

As indicated above, FIG. 6 is provided as an example. Other examples are possible and may differ from what was described in connection with FIG. 6.

Figure 7:
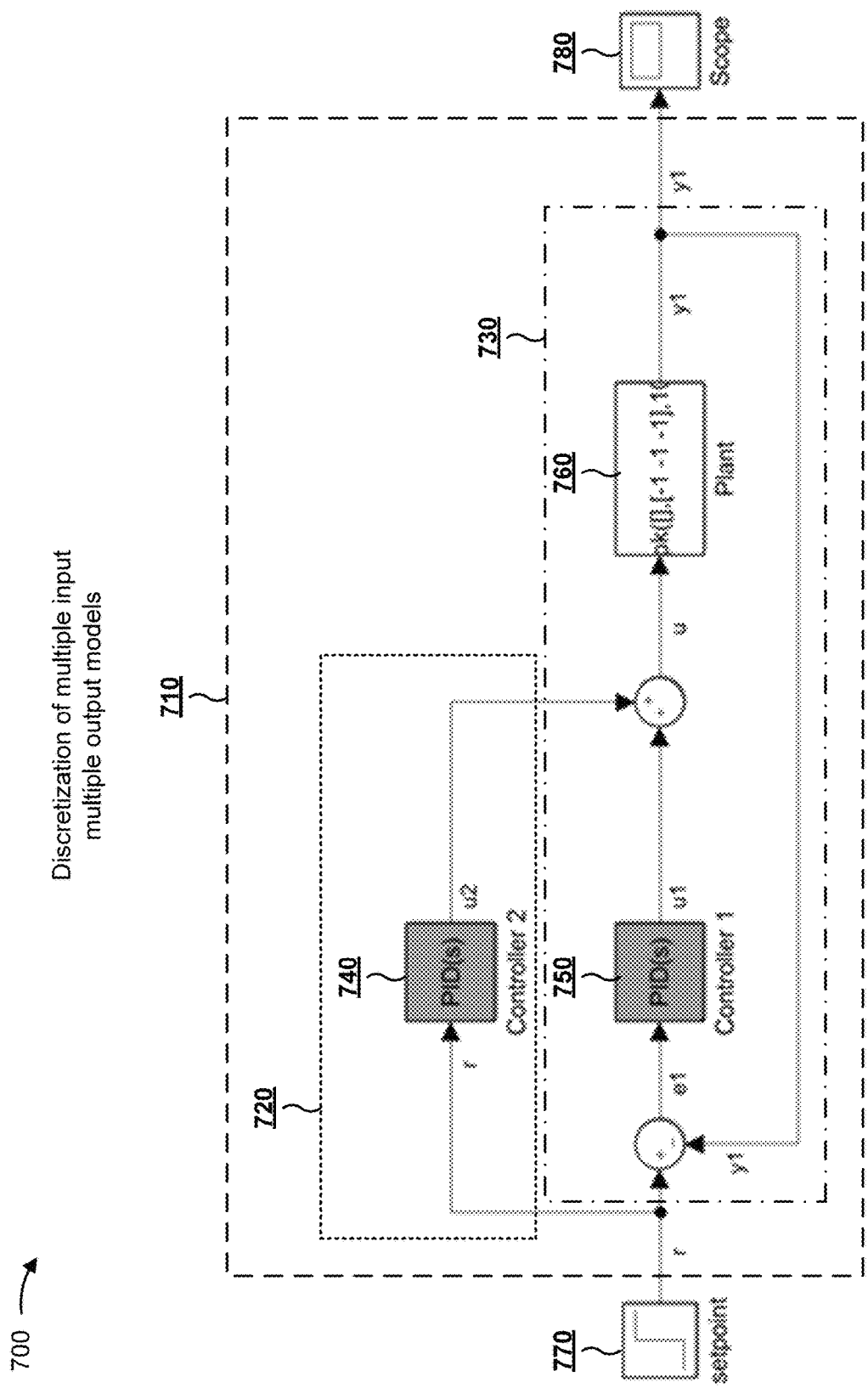

FIG. 7 is a diagram of an example 700 of discretizing a portion of a model of a system using system inputs and outputs. FIG. 7 depicts an example multiple input multiple output model 710 with a feedforward portion 720 and a feedback portion 730. The feedforward portion 720 may include a first portion 740 to be discretized (e.g., shown as Controller 2), and the feedback portion 730 may include a second portion 750 to be discretized (e.g., shown as Controller 1). Furthermore, the model 710 may include one or more portions 760 that are not to be discretized, one or more inputs 770, and one or more outputs 780.

In some implementations, the user may provide user input that identifies the model 710 (e.g., a block diagram model, program code, and/or the like), a continuous linear representation of one or more portion(s) of the model 710 (e.g., a transfer function for Controller 1, Controller 2, and Plant in the continuous domain), the portion(s) to be discretized (e.g., the first portion 740 and the second portion 750), a sample time or rate with which the first portion 740 and/or the second portion 750 is to be discretized, the input 770, the output 780, and/or the like.

The TCE may use the input 770 and the output 780 to obtain a continuous linear representation for the model 710, and may use the continuous linear representation and/or a frequency response associated with the continuous linear representation to discretize the first portion 740 and the second portion 750 to approximate the relationship between the input 770 and the output 780 with reduced discretization error, as described elsewhere herein. In some implementations, the TCE may generate a first continuous linear representation for the feedforward portion 720, and may discretize the first portion 740 to approximate the feedforward portion 720. Similarly, the TCE may generate a second continuous linear representation for the feedback portion 730, and may discretize the second portion 750 to approximate the feedback portion 730. In this way, the TCE may discretize one or more portions of the model 710 for implementation on one or more processors. In some implementations, the model 710 may be transformed into the form of the model 410 of FIG. 4, described above, and the TCE may discretize the portion(s) to be discretized as described elsewhere herein.

As indicated above, FIG. 7 is provided as an example. Other examples are possible and may differ from what was described in connection with FIG. 7.

Figure 8:
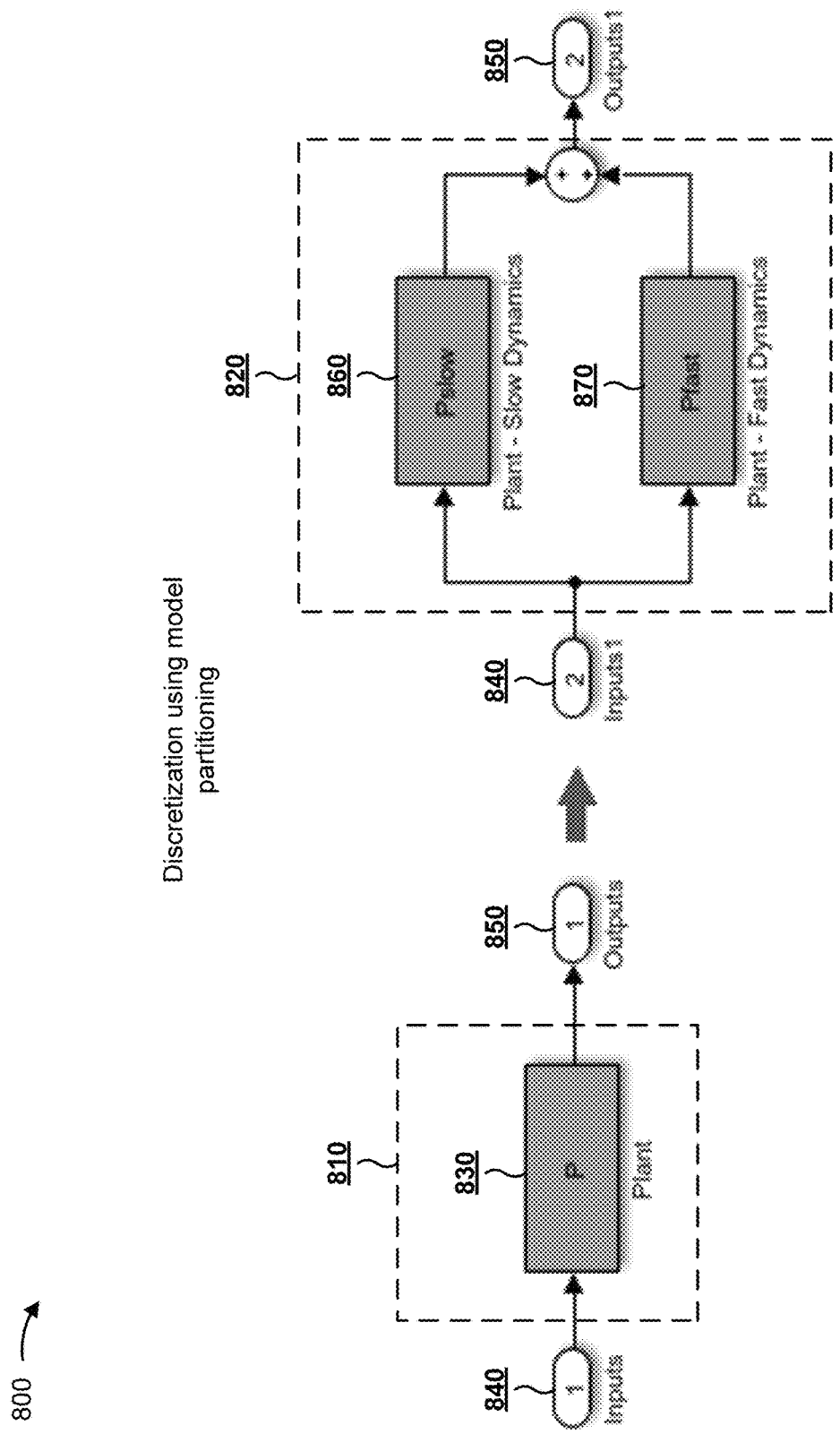

FIG. 8 is a diagram of an example 800 of discretizing a portion of a model of a system using system inputs and outputs. FIG. 8 depicts an example of using model partitioning to partition a model from a first representation 810 to a second representation 820 when discretizing a portion of the model. As shown, the first representation 810 of the model may include a portion 830 to be discretized, as well as input(s) 840 to and output(s) 850 from the model. As further shown, a TCE may partition the model such that the portion 830 is represented using a first portion 860 and a second portion 870 in the second representation 820. In some implementations, the model may include one or more portions that are not to be discretized, as described elsewhere herein.

In some cases, a portion 830 of a model may exhibit fast dynamics and slow dynamics, which may make simulation of the model difficult. Furthermore, the fast dynamics of the portion 830 may require the use of a fast sample rate to obtain an accurate approximation of a continuous-time frequency response. A processor using a fast sample rate will make more calculations than when using a slow sample rate. If the slow dynamics of the portion 830 do not need a fast sample rate, then using the fast sample rate to simulate the slow dynamics may waste processing resources. In this case, the TCE may conserve processing resources by partitioning the portion 830 of the model into a first portion 860 with fast dynamics (e.g., a faster sample rate) and a second portion 870 with slow dynamics (e.g., a slower sample rate). The TCE may then discretize the first portion 860 and the second portion 870 separately, as described above in connection with FIG. 6. When the two discretized portions 860 and 870 are mathematically combined (e.g., summed, multiplied, divided, subtracted, etc.), the combination may approximate the portion 830 with reduced discretization error, as described elsewhere herein.

When using different sample rates with model partitioning, the user may indicate a first sample rate for the first portion 860 and a second sample rate for the second portion 870. Additionally, or alternatively, the user may indicate, or the TCE may determine, one or more portions that are not to be discretized, the input(s) 840, the output(s) 850, and/or the like, as described elsewhere herein. Additionally, or alternatively, the user may indicate whether to discretize the first portion 860, the second portion 870, or both. In some implementations, the user may input a threshold frequency, and the TCE may divide the portion 830 into separate portions 860 and 870 based on the threshold frequency. For example, elements of the portion 830 may be linearized and analyzed to determine frequency behavior of the elements, which may indicate whether different elements (e.g., blocks) have closely related frequency behavior (e.g., within a threshold range, that satisfy a condition, etc.). The elements may be separated into portions 860 and 870 based on this analysis (e.g., to separate elements with slow dynamics vs. fast dynamics, and/or the like). In some implementations, the TCE may analyze the portion 830 and/or frequency data associated with the model to determine the threshold frequency.

In some implementations, the user may provide user input that identifies the model, a continuous linear representation of one or more portion(s) of the model, a sample time or rate with which one or more portions are to be discretized, the input 840, the output 850, and/or the like. The TCE may use the input 840 and the output 850 to obtain a continuous linear representation for the model, and may use the continuous linear representation and/or a frequency response associated with the continuous linear representation to discretize the first portion 860 and the second portion 870 to approximate the relationship between the input 840 and the output 850 with reduced discretization error, as described elsewhere herein.

As indicated above, FIG. 8 is provided as an example. Other examples are possible and may differ from what was described in connection with FIG. 8.

Figure 9:
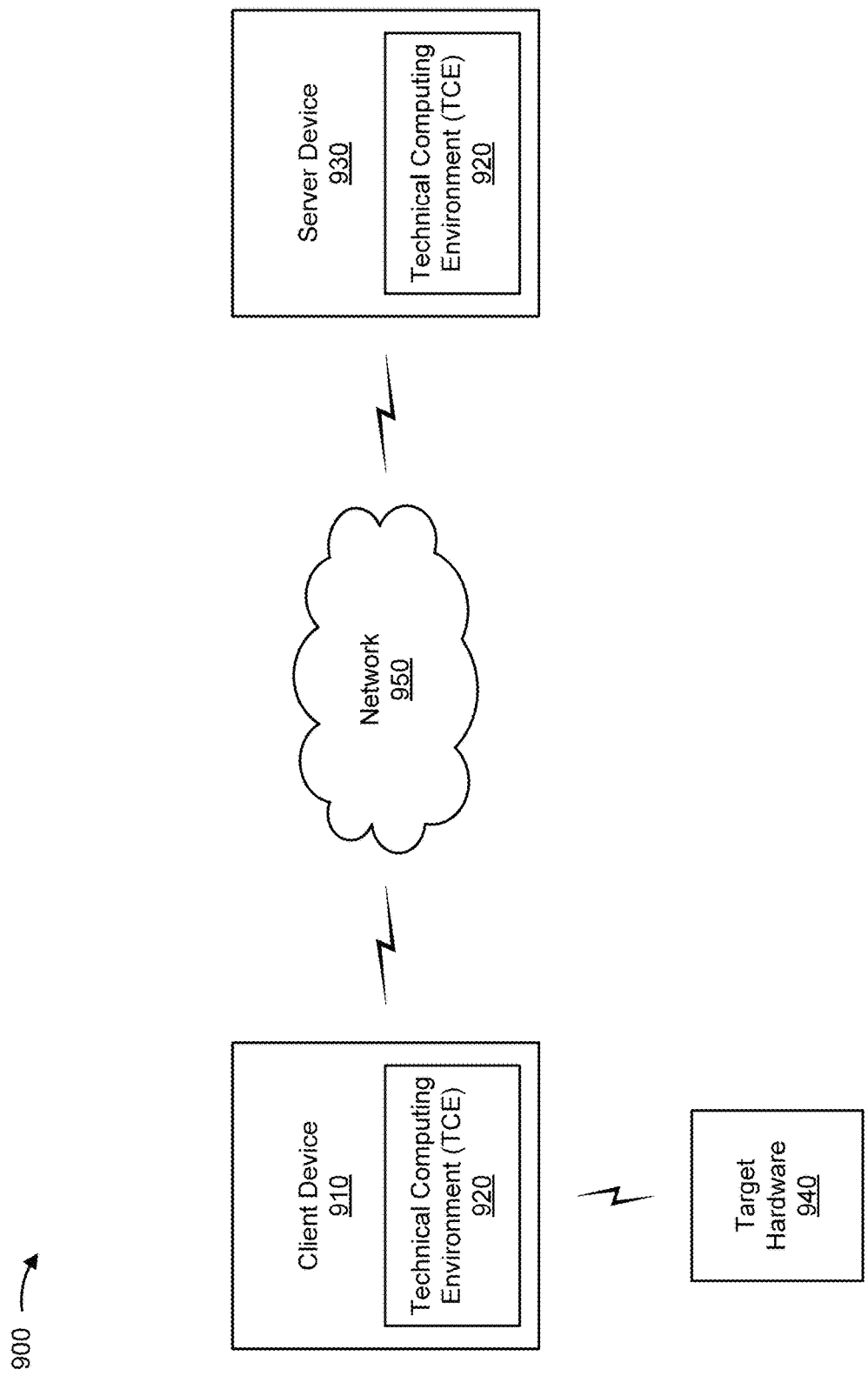
FIG. 9 is a diagram of an example environment in which systems and/or methods, described herein, may be implemented.

FIG. 9 is a diagram of an example environment 900 in which systems and/or methods, described herein, may be implemented. As shown in FIG. 9, environment 900 may include a client device 910, which may include a technical computing environment (TCE) 920. In some implementations, environment 900 may include a server device 930, which may include TCE 920. Additionally, or alternatively, environment 900 may include target hardware 940 and/or a network 950. Devices of environment 900 may interconnect via wired connections, wireless connections, or a combination of wired and wireless connections.

Client device 910 may include one or more devices capable of receiving, generating, storing, processing, and/or providing information associated with a model of a system. For example, client device 910 may include a computing device, such as a desktop computer, a laptop computer, a tablet computer, a mobile phone (e.g., a smart phone, a radiotelephone, etc.), or a similar device. Client device 910 may be used to input a model, execute the model to simulate behavior of a system, discretize one or more portions of the model, output information associated with the model, and/or communicate with one or more other devices (e.g., target hardware 940, and/or the like) to implement the model and/or one or more portions of the model (e.g., one or more discretized portions). In some implementations, client device 910 may receive information from and/or transmit information to server device 930 (e.g., information associated with the model).

Client device 910 may host TCE 920. TCE 920 may include any hardware-based component or a combination of hardware and software-based components that provides a computing environment (e.g., a modeling environment) that allows tasks to be performed (e.g., by users) related to disciplines, such as, but not limited to, mathematics, science, engineering, medicine, and business. TCE 920 may include a text-based modeling environment (e.g., MATLAB® software by The MathWorks, Inc.), a graphically-based modeling environment (e.g., Simulink® software, SimEvents® software, Simscape™ software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), a state-based modeling environment (e.g., Stateflow® software), or another type of environment, such as a hybrid modeling environment that may include, for example, a text-based modeling environment, a graphically-based environment, and/or a state-based modeling environment.

In some implementations, TCE 920 may be integrated with or operate in conjunction with a graphically-based modeling environment, which may provide graphical tools for constructing a model. TCE 920 may include additional tools, such as tools designed to convert a model into an alternate representation, such as program code, source computer code, compiled computer code, a hardware description (e.g., a description of a circuit layout), or the like. In some implementations, TCE 920 may provide this ability using graphical toolboxes (e.g., toolboxes for signal processing, image processing, color manipulation, data plotting, parallel processing, etc.). In some implementations, TCE 920 may provide these functions as block sets. In some implementations, TCE 920 may provide these functions in another way.

A model generated using TCE 920 may include, for example, equations, assignments, constraints, computations, algorithms, process flows, or the like. The model may be implemented in a modeling environment as, for example, a time-based block diagram (e.g., via the Simulink software), a discrete-event based diagram (e.g., via the SimEvents software), a noncausal model diagram (e.g., via the Simscape software), a dataflow diagram, a state transition diagram (e.g., via the Stateflow software), a software diagram, a textual array-based and/or dynamically typed language (e.g., via the MATLAB software), a list or tree, and/or another form. A model generated using TCE 920 may include, for example, a model of a physical system, a computing system, an engineered system, an embedded system, a biological system, a chemical system, or the like.

A model element (e.g., an element, or a portion of the model) in the model may include, for example, a function in a modeling environment (e.g., a MATLAB function), an object in a modeling environment (e.g., a MATLAB system object), a block in a graphically-based modeling environment (e.g., a Simulink block, a Simscape block, a LabView block, an Agilent VEE block, an Agilent ADS block, an Agilent Ptolemy block, etc.), a state representation in a state-based modeling environment (e.g., a Stateflow chart), or the like.

In some implementations, TCE 920 may include a dynamically-typed programming language (e.g., the M language, a MATLAB® language, a MATLAB-compatible language, a MATLAB-like language, etc.) that can be used to express problems and/or solutions in mathematical notations. For example, TCE 920 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 920 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 920 may further provide mathematical functions and/or graphical tools (e.g., for creating plots, surfaces, images, volumetric representations, etc.). In some implementations, TCE 920 may provide these functions and/or tools using toolboxes (e.g., toolboxes for signal processing, image processing, data plotting, parallel processing, etc.). In some implementations, TCE 920 may provide these functions as block sets or in another way, such as via a library, etc.

TCE 920 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 920 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3].

Now suppose the program is executed, for example, in a TCE, such as TCE 920. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 920 may provide mathematical routines and a high-level programming language suitable for non-professional programmers and may provide graphical tools that may be used for creating plots, surfaces, images, volumetric representations, or other representations. TCE 920 may provide these routines and/or tools using toolboxes (e.g., toolboxes for signal processing, image processing, data plotting, parallel processing, etc.). TCE 920 may also provide these routines in other ways, such as, for example, via a library, local or remote database (e.g., a database operating in a computing cloud), remote procedure calls (RPCs), and/or an application programming interface (API). TCE 920 may be configured to improve runtime performance when performing computing operations. For example, TCE 920 may include a just-in-time (JIT) compiler.

TCE 920 may include a modeling system that may be used in the creation of a functional model and that may enable generation of executable code based on the model. For example, TCE 920 may include a graphical modeling tool or application that provides a user interface for a numerical computing environment. Additionally, or alternatively, TCE 920 may include a graphical modeling tool and/or application that provides a user interface for modeling and simulating (e.g., by executing a model) a dynamic system (e.g., based on differential equations, difference equations, discrete events, discrete states, etc.). Execution of a model to simulate a system may also be referred to as simulating a model. The model may further include static relations (e.g., algebraic relations, stochastic relations, inequalities, etc.).

A dynamic system (either natural or man-made) may be a system whose response (e.g., a frequency response) at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems, and/or any other natural dynamic system. Man-made or engineered dynamic systems may include, for example, a bouncing ball, a spring with a mass tied on an end, automobiles, aircrafts, control systems in major appliances, communication networks, audio signal processing systems, and a financial or stock market, and/or any other man-made or engineered dynamic system.

The system represented by a model may have various execution semantics that may be represented in the model as a collection of modeling entities, often referred to as blocks. A block may generally refer to a portion of functionality that may be used in the model. The block may be represented graphically, textually, and/or stored in some form of internal representation. Also, a particular visual depiction used to represent the block, for example in a graphical block diagram, may be a design choice.

A block may be hierarchical in that the block itself may include one or more blocks that make up the block. A block including one or more blocks (sub-blocks) may be referred to as a subsystem block. A subsystem block may be configured to represent a subsystem of the overall system represented by the model. A subsystem block may be a masked subsystem block that is configured to have a logical workspace that contains variables only readable and writeable by elements contained by the subsystem block.

A graphical model (e.g., a functional model) may include entities with relationships between the entities, and the relationships and/or the entities may have attributes associated with them. The entities may include model elements, such as blocks and/or ports. The relationships may include model elements, such as lines (e.g., connector lines) and references (e.g., textual labels). The attributes may include model elements, such as value information and meta information for the model element associated with the attributes. A graphical model may be associated with configuration information. The configuration information may include information for the graphical model, such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

In some implementations, a graphical model may have executable semantics and/or may be executable. An executable graphical model may be a time-based block diagram. A time-based block diagram may consist, for example, of blocks connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks. A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, a non-causal port, an enable port, a trigger port, a function-call port, a publish port, a subscribe port, an exception port, an error port, a physics port, a power port, an entity flow port, a data flow port, a control flow port, etc.

Relationships between blocks may be causal and/or non-causal. For example, a model (e.g., a functional model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

In one example, a block may include or otherwise correspond to a non-causal modeling function or operation. An example of a non-causal modeling function may include a function, operation, or equation that may be executed in different fashions depending on one or more inputs, circumstances, and/or conditions. For example, a non-causal modeling function or operation may include a function, operation, or equation that does not have a predetermined causality. For instance, a non-causal modeling function may include an equation (e.g., $X=2Y$) that can be used to identify the value of one variable in the equation (e.g., "X") upon receiving an assigned value corresponding to the other variable (e.g., "Y"). Similarly, if the value of the one variable (e.g., "X") were provided, the equation could also be used to determine the value of the other variable (e.g., "Y").

Assigning causality to equations may include determining which variable in an equation is computed by using that equation. Assigning causality may be performed by sorting algorithms, as in the Gaussian elimination algorithm. The result of assigning causality may be a lower block triangular matrix that represents the sorted equations with strongly connected components representative of algebraic cycles or loops. Assigning causality may be part of model compilation.

Equations may be provided in symbolic form. A set of symbolic equations may be symbolically processed to, for example, produce a simpler form. To illustrate, a system of two equations $X=2Y+U$ and $Y=3X-2U$ may be symbolically processed into one equation $5Y=-U$. Symbolic processing of equations may be part of model compilation.

As such, a non-causal modeling function may not, for example, require a certain input or type of input (e.g., the value of a particular variable) in order to produce a valid output or otherwise operate as intended. Indeed, the operation of a non-causal modeling function may vary based on, for example, circumstance, conditions, or inputs corresponding to the non-causal modeling function. Consequently, while the description provided above generally describes a directionally specific or consistent signal flow between blocks, in other implementations, the interactions between blocks may not necessarily be directionally specific or consistent.

In some implementations, connector lines in a model may represent related variables that are shared between two connected blocks. The variables may be related such that their combination may represent power. For example, connector lines may represent voltage, current, power, etc. In some implementations, the signal flow between blocks may be automatically derived.

In some implementations, one or more blocks may also, or alternatively, operate in accordance with one or more rules or policies corresponding to a model in which they are included. For instance, if the model were intended to behave as an actual, physical system or device, such as an electronic circuit, the blocks may be required to operate within, for example, the laws of physics (also referred to herein as "physics-based rules"). These laws of physics may be formulated as differential and/or algebraic equations (e.g., constraints, etc.). The differential equations may include derivatives with respect to time, distance, and/or other quantities, and may be ordinary differential equations (ODEs), partial differential equations (PDEs), and/or differential and algebraic equations (DAEs). Requiring models and/or model components to operate in accordance with such rules or policies may, for example, help ensure that simulations based on such models will operate as intended.

A sample time may be associated with the elements of a graphical model. For example, a graphical model may include a block with a continuous sample time such as a continuous-time integration block that may integrate an input value as time of execution progresses. This integration may be specified by a differential equation. During execution, the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

In some implementations, a graphical model may include a block with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

In some implementations, a graphical model may include a block with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. The inferring may be part of a model compilation. For example, the graphical model may include a block, such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristic settings, such as one or more inherited settings, one or more default settings, etc. For example, the data type of a variable that is associated with a block may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

TCE 920 may include, for example, a user interface that provides one or more graphical representations of data. For example, TCE 920 may provide one or more graphical representations of data generated by execution of a program or previously generated data that was imported into TCE 920. In some implementations, TCE 920 may permit a user to interact with TCE 920 to provider user input associated with the model.

TCE 920 may schedule and/or execute a model using one or more computational resources, such as one or more central processing units (CPUs) or cores, one or more field programmable gate arrays (FPGAs), one or more graphics processing units (GPUs), and/or other elements that can be used for computation. TCE 920 may include a compiler that may be used to schedule the model elements of the model, allocate hardware resources, such as memory and CPUs, to the model elements and to the connections that interconnect the model elements, or the like.

Server device 930 may include one or more devices capable of receiving, generating, storing, processing, and/or providing information associated with a model of a system. For example, server device 930 may include a computing device, such as a server, a desktop computer, a laptop computer, a tablet computer, or a similar device. In some implementations, server device 930 may host TCE 920. In some implementations, client device 910 may be used to access one or more TCEs 920 running on one or more server devices 930. For example, multiple server devices 930 may be used to execute program code (e.g., serially or in parallel), and may provide respective results of executing the program code to client device 910.

In some implementations, client device 910 and server device 930 may be owned by different entities. For example, an end user may own client device 910, and a third party may own server device 930. In some implementations, server device 930 may include a device operating in a cloud computing environment. In this way, front-end applications (e.g., a user interface) may be separated from back-end applications (e.g., program code execution). Additionally, or alternatively, server device 930 may perform one, more, or all operations described elsewhere herein as being performed by client device 910.

Target hardware 940 may include one or more processors on which a model and/or a portion of a model is to be implemented. For example, target hardware 940 may represent a plant, and may implement one or more portions of a model, input to TCE 920, that represent the plant. Client device 910 and TCE 920 may assist with such implementation by discretizing the plant or other portion of the model to be implemented by target hardware 940. In some implementations, a controller may execute on client device 910 (e.g., using TCE 920), and may be used to control a plant implemented on target hardware 940. Similarly, in some implementations, target hardware 940 may represent a controller, and may implement one or more portions of a model, input to TCE 920, that represent the controller. Client device 910 and TCE 920 may assist with such implementation by discretizing the controller or other portion of the model to be implemented by target hardware 940. In some implementations, a plant may execute on client device 910 (e.g., using TCE 920), and may be controlled by the controller implemented on target hardware 940.

Network 950 may include one or more wired and/or wireless networks. For example, network 950 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 9 are provided as an example. In practice, there may be additional devices and/or networks, fewer devices and/or networks, different devices and/or networks, or differently arranged devices and/or networks than those shown in FIG. 9. Furthermore, two or more devices shown in FIG. 9 may be implemented within a single device, or a single device shown in FIG. 9 may be implemented as multiple, distributed devices. Additionally, or alternatively, a set of devices (e.g., one or more devices) of environment 900 may perform one or more functions described as being performed by another set of devices of environment 900.

Figure 10:
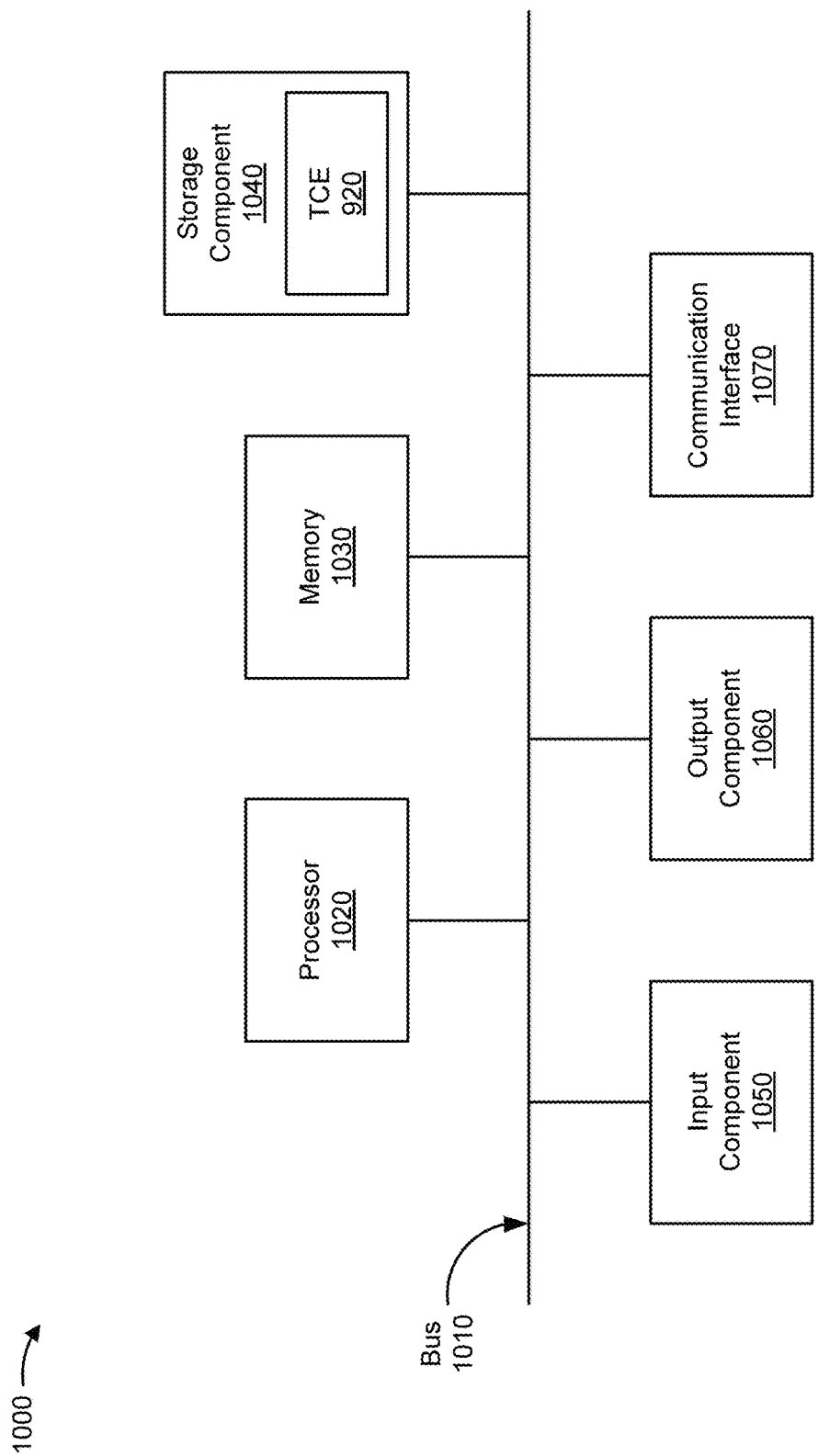
FIG. 10 is a diagram of example components of one or more devices of FIG. 9.

FIG. 10 is a diagram of example components of a device 1000. Device 1000 may correspond to client device 910, server device 930, and/or target hardware 940. In some implementations, client device 910, server device 930, and/or target hardware 940 may include one or more devices 1000 and/or one or more components of device 1000. As shown in FIG. 10, device 1000 may include a bus 1010, a processor 1020, a memory 1030, a storage component 1040, an input component 1050, an output component 1060, and a communication interface 1070.

Bus 1010 includes a component that permits communication among the components of device 1000. Processor 1020 is implemented in hardware, firmware, or a combination of hardware and software. Processor 1020 takes the form of a central processing unit (CPU), a graphics processing unit (GPU), an accelerated processing unit (APU), a microprocessor, a microcontroller, a field-programmable gate array (FPGA), an application-specific integrated circuit (ASIC), or another type of processing component. In some implementations, processor 1020 includes one or more processors capable of being programmed to perform a function. Memory 1030 includes a random access memory (RAM), a read only memory (ROM), and/or another type of dynamic or static storage device (e.g., a flash memory, a magnetic memory, and/or an optical memory) that stores information and/or instructions for use by processor 1020.

Storage component 1040 stores information and/or software related to the operation and use of device 1000. For example, storage component 1040 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 1050 includes a component that permits device 1000 to receive information, such as via user input (e.g., a touch screen display, a keyboard, a keypad, a mouse, a button, a switch, and/or a microphone). Additionally, or alternatively, input component 1050 may include a sensor for sensing information (e.g., a global positioning system (GPS) component, an accelerometer, a gyroscope, and/or an actuator). Output component 1060 includes a component that provides output information from device 1000 (e.g., a display, a speaker, and/or one or more light-emitting diodes (LEDs)).

Communication interface 1070 includes a transceiver-like component (e.g., a transceiver and/or a separate receiver and transmitter) that enables device 1000 to communicate with other devices, such as via a wired connection, a wireless connection, or a combination of wired and wireless connections. Communication interface 1070 may permit device 1000 to receive information from another device and/or provide information to another device. For example, communication interface 1070 may include an Ethernet interface, an optical interface, a coaxial interface, an infrared interface, a radio frequency (RF) interface, a universal serial bus (USB) interface, a Wi-Fi interface, a cellular network interface, or the like.

Device 1000 may perform one or more processes described herein. Device 1000 may perform these processes in response to processor 1020 executing software instructions stored by a non-transitory computer-readable medium, such as memory 1030 and/or storage component 1040. A computer-readable medium is defined herein as a non-transitory memory device. A memory device includes memory space within a single physical storage device or memory space spread across multiple physical storage devices.

Software instructions may be read into memory 1030 and/or storage component 1040 from another computer-readable medium or from another device via communication interface 1070. When executed, software instructions stored in memory 1030 and/or storage component 1040 may cause processor 1020 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 10 are provided as an example. In practice, device 1000 may include additional components, fewer components, different components, or differently arranged components than those shown in FIG. 10. Additionally, or alternatively, a set of components (e.g., one or more components) of device 1000 may perform one or more functions described as being performed by another set of components of device 1000.

Figure 11:
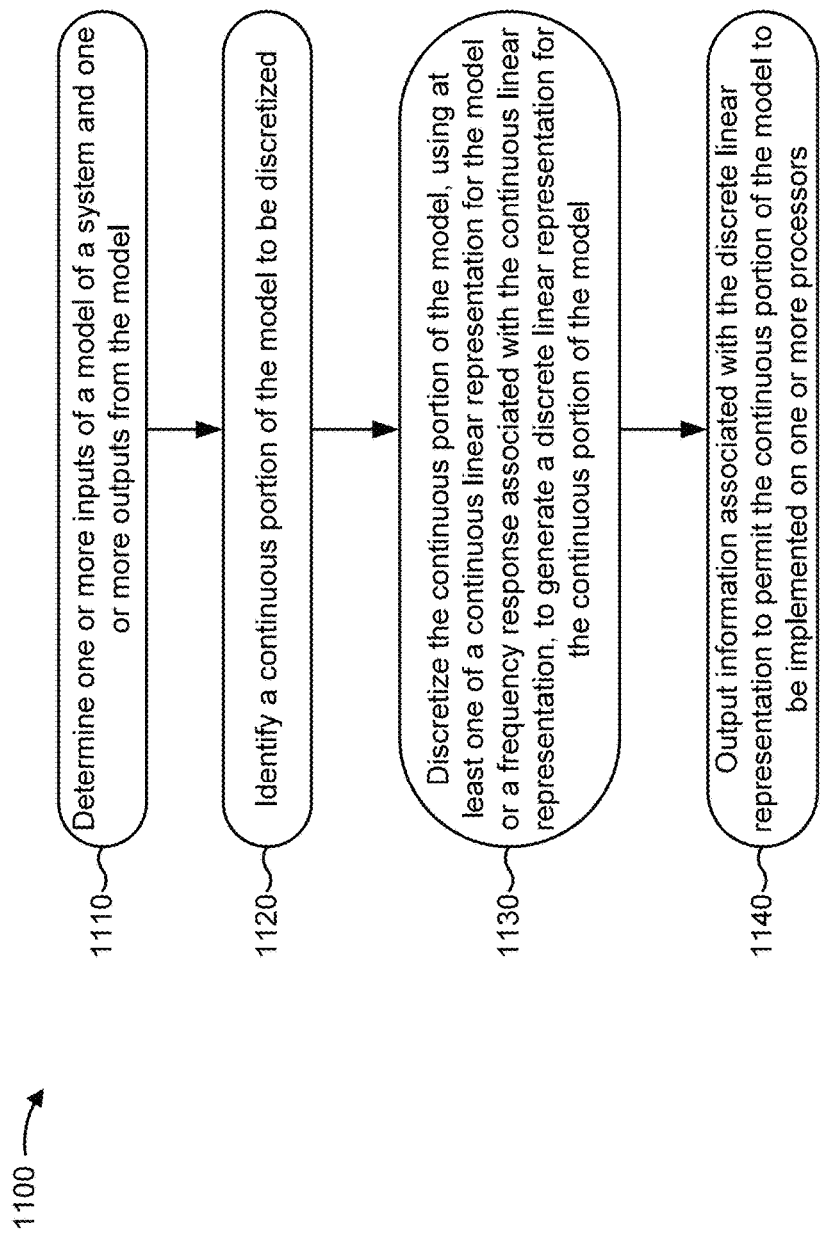
FIG. 11 is a flow chart of an example process for discretizing a model of a system or a portion of the model using system inputs and outputs.

FIG. 11 is a flow chart of an example process 1100 for discretizing a model of a system or a portion of the model using system inputs and outputs. In some implementations, one or more process blocks of FIG. 11 may be performed by TCE 920, such as TCE 920 implemented on client device 910 and/or server device 930. Additionally, or alternatively, one or more process blocks of FIG. 11 may be performed by target hardware 940.

As shown in FIG. 11, process 1100 may include determining one or more inputs to a model of a system and one or more outputs from the model (block 1110). For example, TCE 920 may determine one or more inputs to a model of a system and one or more outputs from the model, as described above in connection with FIGS. 1-8. In some implementations, TCE 920 may determine the one or more inputs and/or the one or more outputs based on at least one of: user input, a model pattern associated with the model, one or more input ports associated with the model, or one or more output ports associated with the model, as described elsewhere herein.

In some implementations, the system is a closed loop system. In some implementations, the system is an open loop system. In some implementations, the system includes a controller and a plant.

As further shown in FIG. 11, process 1100 may include identifying a continuous portion of the model to be discretized (block 1120). For example, TCE 920 may identify a continuous portion of the model to be discretized, as described above in connection with FIGS. 1-8. In some implementations, TCE 920 may identify the continuous portion of the model based on at least one of: user input or automatic model partitioning, as described elsewhere herein. In some implementations, the system includes a controller and a plant, and the continuous portion of the model represents the controller. In some implementations, the system includes a controller and a plant, and the continuous portion of the model represents the plant. In some implementations, the continuous portion of the model to be discretized is less than the entire model.

As further shown in FIG. 11, process 1100 may include discretizing the continuous portion of the model, using at least one of the continuous linear representation for the model or a frequency response associated with the continuous linear representation, to generate a discrete linear representation for the continuous portion of the model (block 1130). For example, TCE 920 may discretize the continuous portion of the model, using at least one of the continuous linear representation or a frequency response associated with the continuous linear representation, to generate a discrete linear representation for the portion of the model, as described above in connection with FIGS. 1-8.

In some implementations, TCE 920 may generate the discrete linear representation by mapping frequency points, associated with the continuous linear representation, to a unit circle. In some implementations, TCE 920 maps the frequency points to the unit circle to maximize a minimum distance between adjacent frequency points, thereby reducing discretization error. In some implementations, TCE 920 may generate the discrete linear representation by normalizing frequency responses associated with the continuous linear representation, thereby reducing discretization error.

As further shown in FIG. 11, process 1100 may include outputting information associated with the discrete linear representation to permit the continuous portion of the model to be implemented on one or more processors (block 1140). For example, TCE 920 may output information associated with the discrete linear representation to permit the portion of the model to be implemented on one or more processors, as described above in connection with FIGS. 1-8.

In some implementations, TCE 920 may discretize and/or provide output associated with multiple portions of the model. For example, TCE 920 may discretize a first portion of the model, and may output information associated with discretization of the first portion of the model, as described above. In some implementations, TCE 920 may discretize a second portion of the model in a different manner than the discretization of the first portion of the model, and may output information associated with discretization of the second portion of the model to permit the second portion of the model to be implemented on one or more processors. In some implementations, the first portion of the model and the second portion of the model are sampled at different rates, as described in more detail elsewhere herein. In some implementations, TCE 920 may discretize the first portion of the model to generate a first discrete linear representation for the first portion of the model, and may discretize the second portion of the model to generate a second discrete linear representation for the second portion of the model.

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Program code (sometimes referred to herein as code) may include, for example, code in a conventional programming language, such as C++, C, Fortran, Pascal, Python, and/or the like. Additionally, or alternatively, program code may include code in a dynamically-typed programming language (e.g., the M language, a MATLAB® language, a MATLAB-compatible language, a MATLAB-like language, etc.) that can be used to express problems and/or solutions in mathematical notations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    determining one or more inputs to a model of a dynamic system and one or more outputs from the model, where the model is implemented in a technical computing environment, and the dynamic system is at least one of: an automotive system, an aerospace system, a communication system, a biological system, a computing system, a signal processing system, a control system, or a mechanical system;
    identifying a continuous portion of the model to be discretize;
    discretizing the continuous portion of the model, using a frequency response associated with or derived from a continuous linear representation for the continuous portion of the model, to generate a discrete linear representation for the continuous portion of the model by mapping frequency points of the frequency response to a unit circle based on a distance measure selected to increase a minimum distance between adjacent ones of the frequency points, where the frequency response is determined based on the one or more inputs and the one or more outputs;
    discrete linear representation; and
    simulating a response of the dynamic system at a plurality of frequencies based on implementing the continuous portion of the model in the technical computing environment based at least in part on the outputted information.

2. The method of claim 1, further comprising obtaining the continuous linear representation for the model based on the one or more inputs and the one or more outputs.

3. The method of claim 1, where the one or more inputs or the one or more outputs are determined based on at least one of:
    user input,
    a model pattern associated with the model,
    one or more input ports associated with the model, or
    one or more output ports associated with the model.

4. The method of claim 1, where the continuous portion of the model is identified based on at least one of:
    user input, or
    automatic model partitioning.

5. The method of claim 1, where the continuous portion of the model is a first continuous portion of the model; and
    where the method further comprises:
        discretizing a second continuous portion of the model, in a different manner than the discretization of the first continuous portion of the model, to generate a second discrete linear representation for the second continuous portion of the model; and
        outputting information associated with discretization of the second continuous portion of the model to permit the second continuous portion of the model to be implemented in the technical computing environment based at least in part on the outputted information associated with the discretization of the second continuous portion of the model.

6. The method of claim 5, where the first continuous portion of the model and the second continuous portion of the model are sampled at different rates.

7. The method of claim 1, where the discrete linear representation is generated during simulation of the model.

8. The method of claim 1, where a sample time, to be used for the discrete linear representation, is selected based on one or more performance constraints; and
    where the discrete linear representation is generated based on the sample time.

9. The method of claim 1, where the dynamic system is at least one of:
    a closed loop system, or
    an open loop system.

10. The method of claim 1, where the dynamic system includes a controller and a plant, and the continuous portion of the model represents one of:
    the controller, or
    the plant.

11. The method of claim 1, where the distance measure is selected to maximize the minimum distance between adjacent ones of the frequency points.

12. The method of claim 1, where the discrete linear representation is generated by normalizing frequency responses associated with the continuous linear representation.

13. The method of claim 1, where the continuous portion of the model to be discretized is less than an entire portion of the model.

14. A non-transitory computer-readable medium storing instructions, the instructions comprising:
    one or more instructions that, when executed by one or more processors, cause the one or more processors to:
        determine one or more inputs to a model of a dynamic system and one or more outputs from the model, where the model is implemented in a technical computing environment, and the dynamic system is at least one of: an automotive system, an aerospace system, a communication system, a biological system, a computing system, a signal processing system, a control system, or a mechanical system;
        identify a continuous portion of the model to be discretized;
        discretize the continuous portion of the model, using a frequency response associated with or derived from a continuous linear representation for the continuous portion of the model, to generate a discrete linear representation for the continuous portion of the model by mapping frequency points of the frequency response to a unit circle based on a distance measure selected to increase a minimum distance between adjacent ones of the frequency points, where the frequency response is determined based on the one or more inputs and the one or more outputs;
    discrete linear representation; and
    simulate a response of the dynamic system at a plurality of frequencies based on implementing the continuous portion of the model in the technical computing environment based at least in part on the outputted information.

15. The non-transitory computer-readable medium of claim 14, where the continuous linear representation is generated based on the one or more inputs and the one or more outputs.

16. The non-transitory computer-readable medium of claim 14, where the frequency response is obtained by injecting one or more input signals at the one or more inputs and reading one or more corresponding output signals at the one or more outputs.

17. The non-transitory computer-readable medium of claim 14, where the distance measure is selected to maximize the minimum distance between adjacent ones of the frequency points.

18. A device, comprising:
one or more processors to:
determine one or more inputs to a model of a dynamic system and one or more outputs from the model, where the model is implemented in a technical computing environment, and the dynamic system is at least one of: an automotive system, an aerospace system, a communication system, a biological system, a computing system, a signal processing system, a control system, or a mechanical system;
identify a continuous portion of the model to be discretized;
discretize the continuous portion of the model, using a frequency response associated with or derived from a continuous linear representation for the continuous portion of the model, to generate a discrete linear representation for the continuous portion of the model by mapping frequency points of the frequency response to a unit circle based on a distance measure selected to increase a minimum distance between adjacent ones of the frequency points, where the frequency response is determined based on the one or more inputs and the one or more outputs;
discrete linear representation; and
simulate a response of the dynamic system at a plurality of frequencies based on implementing the continuous portion of the model in the technical computing environment based at least in part on the outputted information.

19. The device of claim 18, where the continuous linear representation is generated based on the one or more inputs and the one or more outputs.

20. The device of claim 18, where the distance measure is selected to maximize the minimum distance between adjacent ones of the frequency points.

* * * * *